United States Patent
Schecter

(10) Patent No.: US 12,355,650 B1
(45) Date of Patent: *Jul. 8, 2025

(54) VENDOR-AGNOSTIC CLIENTLESS SPEED MEASUREMENT

(71) Applicant: CSC HOLDINGS, LLC, Bethpage, NY (US)

(72) Inventor: Steven J. Schecter, Plainview, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/449,815

(22) Filed: Aug. 15, 2023

Related U.S. Application Data

(63) Continuation of application No. 13/727,292, filed on Dec. 26, 2012, now Pat. No. 11,777,827.

(51) Int. Cl.
  *H04L 43/10* (2022.01)
  *H04L 41/50* (2022.01)
  *H04L 41/5022* (2022.01)
  *H04L 41/5067* (2022.01)
  *H04L 43/08* (2022.01)

(52) U.S. Cl.
  CPC .............. *H04L 43/10* (2013.01); *H04L 41/50* (2013.01); *H04L 41/5022* (2013.01); *H04L 41/5067* (2013.01); *H04L 43/08* (2013.01)

(58) Field of Classification Search
  CPC ..... H04L 41/5067; H04L 43/10; H04L 43/08; H04L 43/20; H04L 43/50
  See application file for complete search history.

(56) References Cited

U.S. PATENT DOCUMENTS

| | | |
|---|---|---|
| 2006/0251116 A1 | 11/2006 | Bedingfield et al. |
| 2008/0095160 A1 | 4/2008 | Yadav et al. |
| 2008/0259810 A1 | 10/2008 | Diroo et al. |
| 2009/0112561 A1 | 4/2009 | Behm et al. |
| 2011/0283013 A1 | 11/2011 | Grosser et al. |
| 2013/0272146 A1 | 10/2013 | Jones |
| 2013/0339495 A1 | 12/2013 | Mower et al. |
| 2014/0024388 A1 | 1/2014 | Earnshaw et al. |
| 2014/0086073 A1 | 3/2014 | Baykal et al. |
| 2015/0281020 A1 | 10/2015 | Yun et al. |
| 2017/0118101 A1 | 4/2017 | Veron et al. |

FOREIGN PATENT DOCUMENTS

EP 2075953 A1 7/2009

*Primary Examiner* — Nam T Tran
(74) *Attorney, Agent, or Firm* — Lowenstein Sandler LLP/ Altice

(57) ABSTRACT

A method is provided. A baseline data count is retrieved from the qualified communication device. Data is then sent destined to a host of the communication device using an address of a host connected to the communication device. An updated data count is retrieved from the communication device. A measured speed of the qualified communication device is then determined using the baseline data count, the updated data count, and a period of time for which the data was sent.

20 Claims, 3 Drawing Sheets

VENDOR-AGNOSTIC CLIENTLESS SPEED MEASUREMENT

CROSS REFERENCE TO RELATED APPLICATIONS

This application is a continuation of U.S. patent application Ser. No. 13/727,292, filed Dec. 26, 2012, now U.S. Pat. No. 11,777,827, which is hereby incorporated by reference in its entirety.

BACKGROUND

Field

Embodiments relate generally to a process of determining communication speed of a communication device.

Background Art

Service providers, such as cable providers, often desire to determine the speed at which devices connect to their network. Typically, a service provider may have a wide variety of communication devices that connect to their network spanning a wide array of manufacturers, models, and device types. For example, a service provider may support cable modems, set top boxes, multimedia terminal adapters (MTAs), or a variety of other devices that connect to their network. Each device may be capable of communicating at a particular speed with the service provider.

Additionally, service providers often advertise one or more particular speeds or bandwidths at which certain devices may expect to communicate with the service provider's network. In particular, this may occur in relation to a service provider's Internet service offerings.

From time to time, a service provider may desire to verify that the speeds at which devices connect to their network are performing as advertised. For example, the service provider may wish to verify the connection speed as part of compliance with government regulations or internal policies.

However, traditional speed measuring techniques typically involve installing speed measuring client software at the location of the device to be measured. This client software communicates with a host located external to the device, such as at the service provider, in order to determine the speed. Accordingly, in such cases, the service provider may only be able to measure speed at device locations where the client software is installed.

Therefore, what is needed are improved speed measurement techniques for communication devices.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. The present embodiments will now be described with reference to the accompanying drawings. In the drawings, like reference numbers may indicate identical or functionally similar elements. In the drawings.

DETAILED DESCRIPTION

While the disclosure is presented herein with reference to illustrative embodiments for particular applications, it should be understood that the disclosure is not limited thereto. Those skilled in the art with access to the teachings provided herein will recognize additional modifications, applications, and embodiments that are contemplated within the scope of the disclosure.

Figure 1:
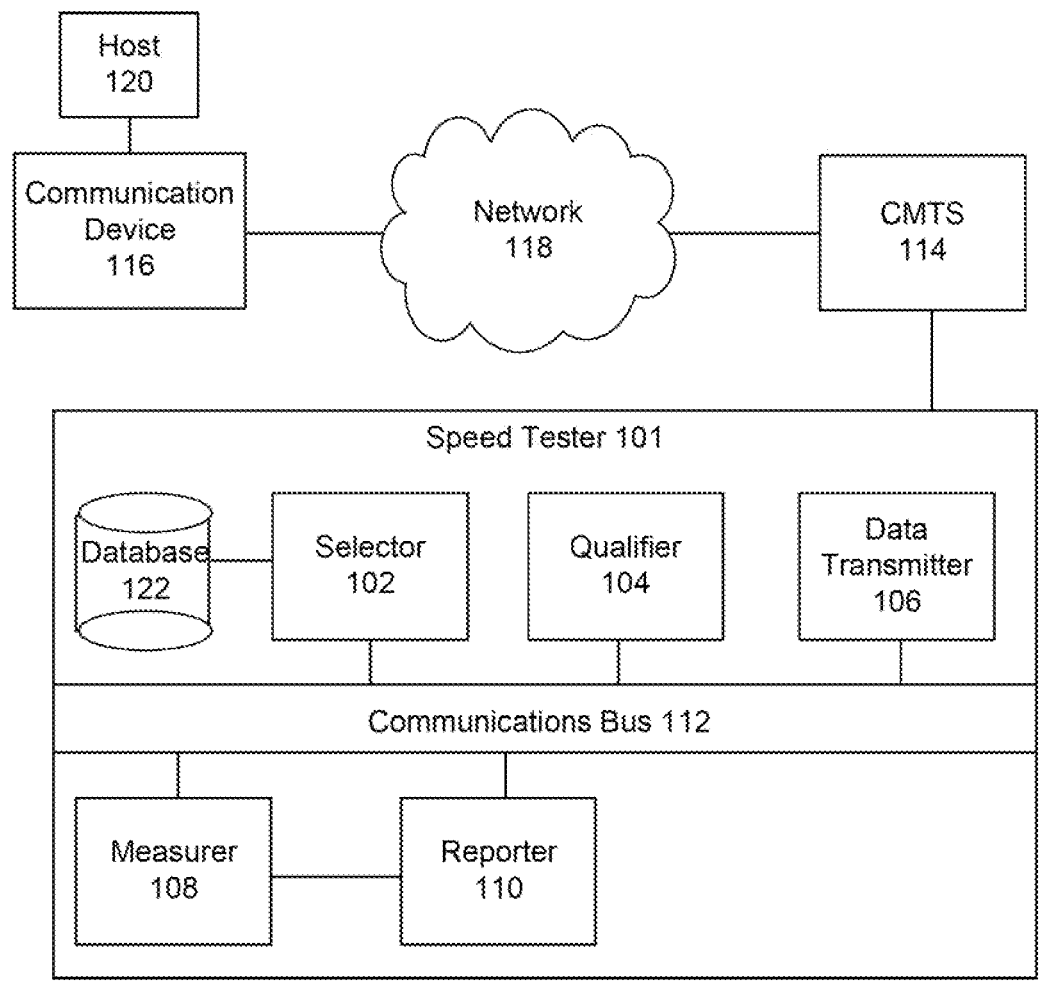
FIG. 1 is a block diagram of a system for vendor-agnostic clientless speed measurement of a communication device, according to an exemplary embodiment.

FIG. 1 is a block diagram of a system 100 for vendor-agnostic clientless speed measurement of a communication device, according to an exemplary embodiment.

System 100 includes a speed tester 101, a network 118, a CMTS 114, and a communication device 116. Speed tester 101 may be connected over network 118 to communication device 116. Network 118 may be any type of network, including, but not limited to, wired, wireless, Ethernet, coaxial, fiber-optic, hybrid-fiber-coaxial, or any combination thereof. Network 118 may support a variety of communication protocols, including, but not limited to, DOCSIS, IPv4, or IPv6.

In an exemplary embodiment, system 100 may also include a cable modem termination system 114 (CMTS). CMTS 114 may be responsible for converting communications into a form that may be transmitted over network 118. For example, communications may be received at CMTS 114 in the Ethernet protocol format; CMTS 114 may then convert these communications into the DOCSIS protocol for communication over network 118.

For ease of description, FIG. 1 depicts a single communication device 116. However, system 100 may include multiple communication devices. Communication device 116 may be any type of device capable of communicating with a service provider over network 118, including, but not limited to, a cable modem, a set-top box, a multimedia terminal adapter (MTA), a DSL modem, or a network interface card. In addition, communication device 116 may have one or more hosts connected to it, such as host 120.

Host 120 communicates with network 118 using communication device 116. Host 120 may be any type of computing device, including by not limited to, a router, network switch, personal computer, server, set-top-box, laptop, or a mobile device. Typically, communication device 116 is configured to receive one or more Internet protocol (IP) addresses from the service provider over network 118. In an exemplary embodiment, one or more IP addresses are statically assigned to communication device 116. An IP address serves as an identifier for a device communicating via the Internet protocol. Once communication device 116 receives the one or more IP addresses from the service provider, communication device 116 assigns the one or more addresses to hosts connected to communication device 116, such as host 120. Accordingly, when communications sent over network 118 are addressed to the IP address assigned to host 120, they are first received by communication device 116 and then sent to host 120.

In an exemplary embodiment, speed tester 101 is configured to determine the connectivity speed of communication device 116. More particularly, speed tester 101 is configured to be vendor-agnostic. For example, speed tester 101 may operate on communication device 116 despite its particular make and model. Speed tester 101 is also configured to be clientless, and thus, does not require any additional software to be installed at either host 120 or communication device 116 in order to measure the connectivity speed of communication device 116.

Speed tester 101 includes a communications bus 112 that facilitates communication between any of the modules or devices further described herein. Communications bus 112 may allow for both parallel and serial connections between devices and modules connected to communications bus 112. Communications bus 112 may also include one or more wires or any other communications mechanism that facilitates communication between the devices or modules connected to communication bus 112. In an exemplary embodiment, communications bus 112 is configured to facilitate communication between any of the devices connected to communications bus 112 and devices external to speed tester 101, such as CMTS 114, communication device 116, or host 120.

Speed tester 101 further includes a selector 102, qualifier 104, a data transmitter 106, and a measurer 108. As discussed above, system 100 may include many communication devices. Accordingly, speed tester 101 includes, in an embodiment, a selector 102 configured to determine which communication device(s) to test, such as communication device 116. For example, a user may contact a support organization from the service provider and specify that their communication device, such as communication device 116, is experiencing degraded service. In such a case, the support organization, as part of their troubleshooting process, may configure selector 102 to select communication device 116 to test. However, in some cases, a service provider may also wish to test more than one communication device.

According to an exemplary embodiment, selector 102 may be configured to select multiple communication devices for speed testing. For example, as part of compliance with government agencies or internal policies, a service provider may wish to test multiple communication devices to verify that the speeds of the devices are operating within certain thresholds.

In an exemplary embodiment, selector 102 may be configured to operate in systemic mode. In systemic mode, selector 102 is configured to select at random a specified number of communication devices. For example, selector 102 may be optionally connected to a database 122. Database 122 contains information related to a large number of the communication devices connected to the service provider. Specifically, database 122 may contain all of the communication devices connected to the service provider, or a large subset, such as all of the communication devices of a particular region or regions. Database 122 may be any type of database, such as an SQL database, a plain text file, XML file, or any other set of data structures that may store and associate information about communication devices. Selector 102 is configured to then select at random the specified number of communication devices to be tested by querying database 122.

In an exemplary embodiment, selector 102 is configured for targeted mode. In targeted mode, selector 102 is configured to select one or more communication devices to test based upon additional criteria stored in database 122. For example, database 122 may store a number of fields related to a communication device, such as geographic location, service class, or any other relevant data. In such cases, selector 102 may be able to select all communication devices matching the selected criteria, for example by geographic region. Selector 102 may also be able to select a specified number of devices at random matching the selected criteria.

In some cases, a service provider may wish for certain conditions to be met before communication device 116 is tested. For example, even though communication device 116 may have been selected by selector 102, there still may be additional conditions that may be required to be met before communication device 116 is tested. Accordingly, speed tester 101 includes, in an embodiment, a qualifier 102 for determining whether a particular communication device 116 is qualified to be measured. In particular, a service provider may configure certain predicates that must be met prior to testing communication device 116. For example, some service providers may provide phone services using network 118 and communication device 116. However, in some cases, as a result of using speed tester 101 to test communication device 116, phone call quality may become degraded. Accordingly, qualifier 102 may be optionally configured to not permit speed tests of communication device 116 while there is an on-going phone call using communication device 116 or another communication device at the customer's premises that is using network 118.

Qualifier 102 may also be configured to permit speed tests only at certain times of the day, such as, for example during projected low traffic periods. This may permit more accurate measurements of the maximum speed that communication device 116 may achieve with the service provider. However, in other cases, qualifier 102 may permit speed tests during peak hours. For example, a service provider may wish to run a speed test during peak hours to comply with governmental testing requirements or evaluate performance during peak hours. Qualifier 102 may also be configured to establish a variety of other qualifications that communication device 116 must have before it can be tested. For example, qualifier 102 may be configured to determine whether communication device 116 is certified by the service provider.

Some service providers may have certain makes and models of communication devices that they have certified as being compatible with their network. In such cases, qualifier 102 may query communication device 116 to determine its make and model and compare that against a list of certified makes and models of communication devices. Qualifier 102 may also query communication device 116 using simple network management protocol (SNMP) to determine its make and model or by using other means for determining whether communication device 116 is certified. For example, database 122 may contain information related to communication device 116 as to whether it is certified or not.

In an exemplary embodiment, communication device 116 is required to have an established host before a speed test can be run on communication device 116. More particularly, qualifier 102 is configured to determine whether communication device 116 has an established host by checking database 122 or another database that includes information related to assigned IP addresses to determine whether communication device 116 has been assigned any IP addresses. Qualifier 102 may also be configured to query communication device 116 directly using SNMP to determine whether communication device 116 has any established hosts.

In order to measure the speed of communication device 116, speed tester 101 includes a measurer 108. In particular, measurer 108 may identify one or more downstream channels currently being used by communication device 116. The downstream channels are communication channels used to communicate data from CMTS 114 to communication device 116. Depending on the total bandwidth of the network and the tier of service assigned to communication device 116, communication device 116 may use more than one downstream channel. In an exemplary embodiment, for each of the downstream channels that communication device 116 uses, communication device 116 may keep a count of all received data. In addition, or alternatively, communication device 116 may also keep an aggregate count of data used for all downstream channels.

Measurer 106 is configured to communicate with CMTS 114 to determine the downstream channels of communication device 116. Measurer 108 is further configured to retrieve a baseline count of the data received by communication device 116 on the downstream channels prior to the test being started. For example, communication device 116 may include counters that count the amount of data received on each of the downstream channels. The contents of the counters for each of the downstream channels used by communication device 116 are retrieved by measurer 108 using SNMP and then aggregated. Measurer 108 may retrieve the counters by querying a field configured to store the counters, such as, by way of non-limiting example, an "iflnOctet" field using SNMP. The iflnOctet field is so named because it stores the counters as an octet, although one skilled in the relevant arts will recognize that other storage formats may be utilized, and this particular approach is provided by way of example, and not limitation.

In the cases where communication device 116 already aggregates the counters, the aggregated data count may instead retrieved by measurer 108 using SNMP. However, a person of skill in the art would recognize that there may be other methods for retrieving a baseline count of the amount of received data from communication device 116.

Speed tester 101 also includes a data transmitter 106. Data transmitter 106 is configured to transmit data to host 120 for a period of time after the baseline is established. The period of time that the data is transmitted may be any amount of time, for example 25 seconds. In an exemplary embodiment, data transmitter 106 is configured to send the data to host 120 using user datagram protocol (UDP). However any other protocol, such as transfer control protocol (TCP) may also be used (i.e. by opening a listening port on communication device 116). Data transmitter 106 may create the data using random data; however, other non-random data may also be used.

In order to determine the amount of data to send to communication device 116, data transmitter 106 may first determine the service class of communication device 116. For example, as discussed above, service providers may offer different tiers of service, referred to as service classes. Each of the tiers may correspond to different advertised speeds. In addition, while a service provider may advertise a certain speed for a particular tier, the service provider may in fact provide a higher than advertised speed for that tier. Data transmitter 106 may use a variety of means to detect the service class. For example, database 122 may be configured to associate a service class with each of the respective communication devices stored therein, such as communication device 116. In such a case, data transmitter 106 is configured to query database 122 to determine the service class of communication device 116. However, a person of skill in the art would recognize that there may be other methods for determining the service class of communication device 116. For example, data transmitter 106 may query communications device 116 directly, using SNMP or another suitable mechanism, to determine the service class. Alternatively, data transmitter 106 may query CMTS 114 to determine the service class of communications device 116.

After the service class has been determined for communication device 116, data transmitter 106 is configured to send an amount of data that exceeds the advertised or unadvertised bandwidth for the service class. For example, if the bandwidth advertised for a particular service class is 10 megabits/second then the speed at which data is sent may exceed 10 megabits/second. This may provide a more accurate measurement of the speed of communication device 116, because all of the advertised or unadvertised bandwidth may be consumed during the speed test.

In some cases, the data sent as part of the speed test may cause unintended reactions from applications installed on host 120. For example, host 120 may have a firewall or bandwidth monitoring program that reacts in an unintended manner when the data that is part of the speed test is received at host 120. Accordingly, in an exemplary embodiment, measurer 108 is further configured to cause communication device 116 to drop the data destined for host 120. As a result, any data sourced from data transmitter 106 and destined for host 120 may be blocked. In particular, measurer 108 is configured to add an access control list (ACL) to communication device 116 that instructs communication device 116 to drop all of the traffic destined for host 120 related to the speed test. The data used for the speed test may be destined for a specified port on host 120, for example port 1234. In such a case, the ACL could cause communication device 116 to block all traffic destined for port 1234 on host 120 originating from data transmitter 106. Accordingly, communication device 116 is configured to drop all packets from the speed test destined for host 120.

Measurer 108 is further configured to retrieve an updated data count from communication device 116 for each of the downstream channels after data transmitter 106 sends the data. The updated data count includes a count of the data received as part of the speed test as well as the baseline data count. Measurer 108 is configured to use similar methods to retrieve the updated data count as used to retrieve the baseline data count. For example, measurer 108 may be configured to retrieve and aggregate the "iflnOctet" counters using SNMP. In cases where the data count is aggregated in communication device 116, measurer 108 may be configured to retrieve the aggregated data count.

After the updated data count is retrieved, the speed may be calculated by measurer 108. In particular, measurer 108 is configured to subtract the baseline data count from the updated data count, to get the total amount of data sent to communication device 116 during the test. In an exemplary embodiment, the data count is stored in bytes within communication device 116. For example, the "iflnOCtet" counters may store the data count in octets or bytes. Data communication speed, however, is often measured in bits per second. Thus, the data count may need to be converted from bytes to bits.

In order to determine the speed in bits/second, the total data transmitted during the test may be multiplied by eight and then divided by the time period that the data stream was sent. For example, if the data counters of communication device 116 started at 1,000,000 bytes, and after data transmitter 106 transmits the data to host 120 they are at 20,000,000 bytes, the total number of bytes sent during the test would be 19 million bytes. To convert bytes to bits, measurer 120 may multiply the number of bytes by eight, in other words, 19 million bytes may be converted to 152 million bits. If the entire data stream of 152 million bits was sent over 25 seconds, that would equal 6.08 million bits per second, or a speed of approximately six megabits. After the speed has been measured, measurer 108 is further configured to remove the ACL applied to communication device 116. This results in communication device 116 resuming service as usual.

In an exemplary embodiment, speed tester 101 also includes reporter 110. Reporter 110 is configured to record the results of a speed test, for example the speed test of communication device 116. Reporter 110 may also be configured to send the results to the service provider for instant analysis, for example via email or some other transmission means. If multiple communication devices are tested, the results sent to the service provider may include information such as, the average speed of the communication device, or other relevant information.

In an exemplary embodiment, reporter 110 is configured to record the results of a speed test in a database. Reporter 110 may record the measured speed of communication device 116. Reporter 110 may also compare the measured speed against the service class of communication device 116 to determine whether the measured speed is in accordance with the advertised or unadvertised speeds of the service class. In an exemplary embodiment, reporter 110 then records the results of whether the measured speed is in accordance with the service class.

Reporter 110 may also be configured to record a variety of other metrics regarding the speed test conducted on communication device 116. By way of non-limiting example, reporter 110 may record the date/time of the stamp, the number of established hosts that communication device 116, geographic location of communication device 116, other data retrieved via SNMP from communication device 116, or the reason for request of the speed test. For example, reporter 110 may record whether the speed test was requested by a customer service agent or whether the speed test was related to internal or governmental compliance testing. The database may then be queried by a web application or some other service used by the service provider to determine the results of the speed test. In particular, the database may record the results of multiple speed tests, which may be aggregated by the service provider for comparison analysis or for other means.

Figure 2:
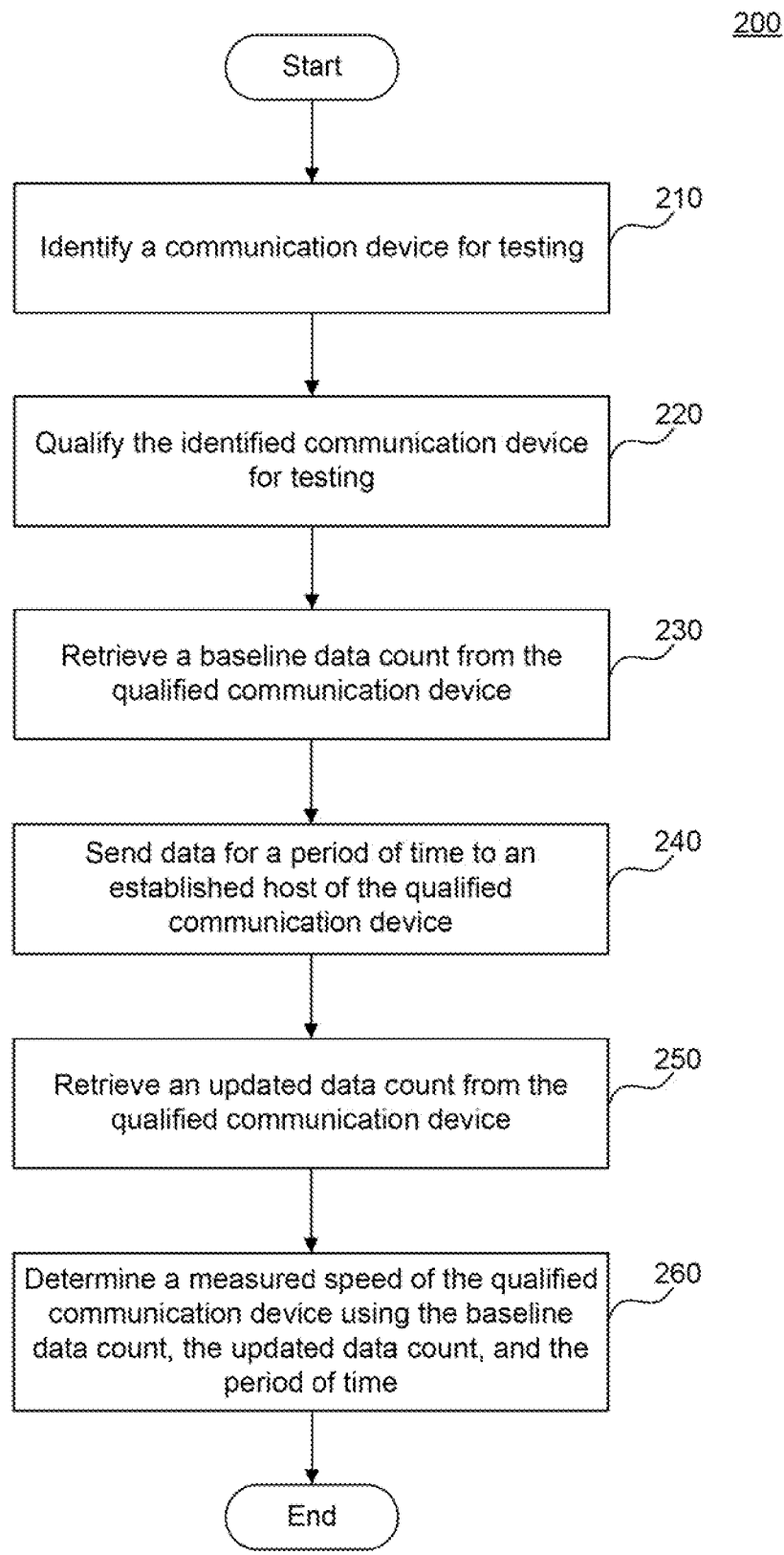
FIG. 2 is a flow diagram of a method for vendor-agnostic clientless speed measurement of a communication device, according to an exemplary embodiment.

FIG. 2 is a flow diagram of a method 200 for vendor-agnostic clientless speed measurement of a communication device, according to an exemplary embodiment.

At box 210 of method 200, a communication device is identified for testing. According to an exemplary embodiment, a single communication device may be identified, such as communication device 116 of FIG. 1. For example, a user may contact a support organization from a service provider and specify that their communication device is experiencing degraded service. In such a case, the support organization, as part of their troubleshooting process, may identify a particular communication device to test.

In some cases, a service provider may also wish to test more than one communication device. For example, as part of compliance with government agencies or internal policies, a service provider may wish to test multiple communication devices to verify that the speeds of the devices are operating within certain thresholds.

According to an exemplary embodiment, in such cases, the one or more communication devices to be tested are identified at random. In particular, a specified number of devices to be tested may be provided and then the devices may be selected at random from a larger group of devices connected to the service provider. For example, the service provider may store information about a large number of devices connected to their network in a database, such as database 122 of FIG. 1. The database may then be queried at random to select the specified number of devices.

The database may further include a variety of fields related to each communication device connected to the service provider. For example, the database may include fields related to geographic location, service class, or any other relevant data for each communication device stored therein. These fields may then be further used during the speed testing or to narrow the communication devices selected based upon certain criteria. In particular, during the identification process, criteria related to the fields stored in the database may be specified to further narrow the communication devices identified for testing. For example, geographic location may be used as criteria to narrow the number of communication devices selected to particular geographic area. In an exemplary embodiment, all of the communication devices that match the criteria are selected. However, a specified number of the communication devices that match the criteria may also be selected at random.

At box 220, the identified communication device is qualified for testing. In some cases, a service provider may wish for certain conditions to be met before a communication device may be tested. For example, even though a communication device may have been identified for testing, there still may be additional conditions that may be required to be met before the communication device may be tested.

In an exemplary embodiment, the communication device is qualified by a qualifier, such as qualifier 102 of FIG. 1, to determine the communication device is qualified to be measured. For example, some service providers may provide phone services using a communication device or the same network to which a communication device is connected. However, in some cases, as a result of the speed test, phone call quality may become degraded. Accordingly, in an exemplary embodiment, speed tests are not be permitted while there is an on-going phone call using a communication device or another communication device at the customer's premises.

In an exemplary embodiment, speed tests are only be permitted at certain times of the day, for example during projected low traffic periods. This may permit more accurate measurements of the maximum speed that the communication device may achieve with the service provider. However, there may be other qualifications that a communication device must meet before the communication device can be tested. For example, a communication device may be required to be a certified device by the service provider before it can be tested. In particular, some service providers may have certain makes and models of communication devices that they certify as being compatible with their network. In such a case, the make and model of the communication device may be compared against a list of certified makes and models of communication devices.

The communication device may also be required to have an established host before a speed test can be run. This may be determined by checking a database, such as database 122 of FIG. 1, or another database storing assigned IP addresses to determine whether the communication device has been assigned any IP addresses. In an exemplary embodiment, the communication device is queried directly using SNMP to determine whether the communication device has any established hosts.

At box 230, a baseline data count is retrieved from the qualified communication device. In order to measure the speed of a communication device, the downstream channels used by the communication device may first need to be determined. For each of the downstream channels that a particular communication device uses, the communication device may keep a count of all received data. However, in an exemplary embodiment, the communication device may keep an aggregate count of the data In an exemplary embodiment, a baseline count of each downstream's received data counters is retrieved for the communication device. For example, the contents of the data counter for each of the downstream channels may be retrieved using SNMP and aggregated. However, a person of ordinary skill in the art would recognize that other methods for retrieving a baseline of the amount of received data from a communication device are contemplated within the scope of this disclosure.

At box 240, data is sent for a period of time to an established host of the qualified communication device. In an exemplary embodiment, the data may be sent by a data transmitter, such as data transmitter 106 of FIG. 1, to an established host, such as host 120 of FIG. 1. The period of time that the data is transmitted may be any amount of time, for example 25 seconds. In an exemplary embodiment, the period of time is predetermined, however the period of time may also be chosen on-the-fly based on a number of factors, such as, including, but not limited to, current network conditions, date/time of the test, or the particular condition that caused the speed measurement. The data may be sent to the established host using user datagram protocol (UDP), however any other protocol, such as transfer control protocol (TCP) may also be suitable (i.e. by opening a listening port on the communication device) . . . . In an exemplary embodiment, the data may be created using random data, however, other non-random data may also be used. By way of non-limiting example, the data may be a predetermined message repeated a number of times to equal the amount of data desired to be sent, or anonymized previously recorded traffic in order to simulate more realistic traffic patterns. The amount of data sent may be determined based upon the service class of the communication device. In particular, the speed at which the data is sent may exceed either the advertised or unadvertised speed of the service class.

In some cases, the data sent as part of the speed test may cause unintended reactions from applications installed on the host. For example, the host may have a firewall that reacts in an unintended manner when the data that is part of the speed test is received at the host. Accordingly, in an exemplary embodiment, the communication device associated with the host may be configured to temporarily drop the data destined for the host during the speed test. In particular, an access control list (ACL) may be added to the communication device instructing the communication device to drop all of the traffic destined for the host related to the speed test.

At box 250, an updated data count is retrieved from the qualified communication device. In an exemplary embodiment, the updated data count may be retrieved by a measurer, such as measurer 108 of FIG. 1. The updated data count includes a count of the data received as part of the speed test as well as the baseline data count. The updated data count may be retrieved using similar methods as are used to retrieve the baseline data count. For example, the updated data count may be retrieved by using SNMP to retrieve the "ifInOctet" counters from the communication device, although one skilled in the relevant arts will recognize that other techniques may be utilized and are contemplated within the scope of this disclosure.

At box 260, a measured speed is determined for the qualified communication device using the baseline data count, the updated data count, and the time period. In an exemplary embodiment, the measured speed may be calculated using a measurer, such as measurer 108 of FIG. 1. There may be a variety of methods that can be used to calculate the speed depending on the particular data retrieved from the communication device. For example, the baseline data count may be subtracted from the updated data count, to get the total amount of data sent to the qualified communication device during the test. The "ifInOCtet" counters, however may store the data count in octets or bytes. However, data communication speed is often measured in bits per second. Thus, the data count may need to be converted from bytes to bits. Thus, in order to determine the speed in bits/second, the total data transmitted during the test may be multiplied by eight and then divided by the time period that the data stream was sent. In an exemplary embodiment, after the speed has been measured the ACL may then be removed from the qualified communication device. This may result in the qualified communication device resuming service as usual.

In an exemplary embodiment, the results of the speed test may be further recorded. For example, the results may be sent to the service provider for immediate viewing. If multiple communication devices are tested, the results may include information such as the average speed of the communication devices, by way of non-limiting example. However, a person of ordinary skill in the art would know that the results may include a variety of different metrics that can be calculated or retrieved during the speed testing process.

In an exemplary embodiment, the results may be recorded in a database. For example, the speed that was measured of the communication device may be recorded in the database. Whether the communication device's measured speed is in accordance with its respective service class may also be recorded in the database. A variety of other metrics regarding the speed test may also be recorded. For example, the following information, including but not limited to, the date/time of the stamp, the number of established hosts that communication device, geographic location of communication device, other data retrieved via SNMP from communication device, or the reason for request of the speed test may also be recorded in the database.

Figure 3:
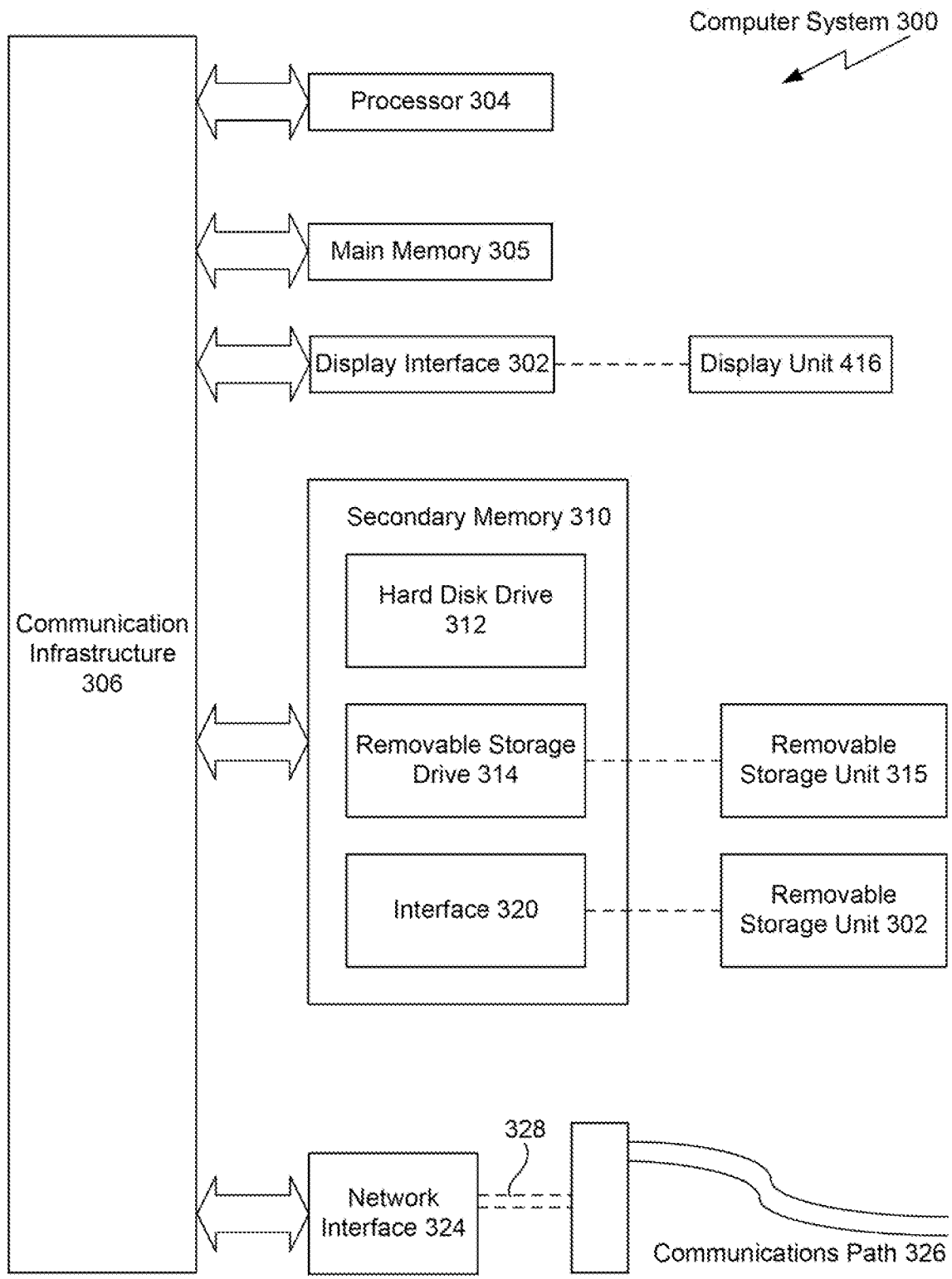
FIG. 3 is a block diagram of a computing environment where disclosed embodiments may be implemented.

FIG. 3 illustrates an example computer system 300 in which embodiments as described above, or portions thereof, may be implemented. For example, system 100, speed tester 101, or method 200, including portions thereof, may be implemented using computer system 300. Computer system 300 may use hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1 & 2.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a physical memory may be used to implement the above-described embodiments. A processor device may be a single processor, a plurality of processors, or combinations thereof. Processor devices may have one or more processor "cores."

As will be appreciated by persons skilled in the relevant art, processor device 304 may also be a single processor in a multi-core/multiprocessor system, such system operating alone, or in a cluster of computing devices operating in a cluster or server farm. Processor device 304 is connected to a communication infrastructure 306, for example, a bus, message queue, network, or multi-core message-passing scheme.

Various embodiments of the invention are described in terms of this example computer system 300. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Computer system 300 also includes a main memory 308, for example, random access memory (RAM), and may also include a secondary memory 310. Secondary memory 310 may include, for example, a hard disk drive 312 and removable storage drive 314. Removable storage drive 314 may include a floppy disk drive, a magnetic tape drive, an optical disk drive, a flash memory, or the like. The removable storage drive 314 reads from and/or writes to a removable storage unit 318 in a well-known manner. Removable storage unit 318 may include a floppy disk, magnetic tape, optical disk, etc. which is read by and written to by removable storage drive 314. As will be appreciated by persons skilled in the relevant art, removable storage unit 318 includes a computer readable storage medium having stored thereon computer software and/or data.

In alternative implementations, secondary memory 310 may include other similar storage means for allowing computer programs or other instructions to be loaded into computer system 300. Such storage means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 (optionally) includes a display interface 302 (which can include input and output devices such as keyboards, mice, etc.) that forwards graphics, text, and other data from communication infrastructure 306 (or from a frame buffer not shown) for display on display unit 330.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, coaxial cable, hybrid-fiber coaxial, a phone line, a cellular phone link, an RF link or other communications channels.

In this document, the term "computer readable storage medium" is used to generally refer to media such as removable storage unit 318, removable storage unit 322, and a hard disk installed in hard disk drive 312. Computer readable storage medium may also refer to memories, such as main memory 308 and secondary memory 310, which may be memory semiconductors (e.g. DRAMs, etc.).

Some embodiments may be directed to computer products comprising software stored on any computer readable storage medium. Such software, when executed in one or more data processing devices, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described embodiments.

What is claimed is:

1. A method for performing a connectivity speed test for a communication device, the method comprising:

receiving, by a server from a communication device, a first data count that includes an amount of data received by the communication device prior to the connectivity speed test being performed;

determining, by the server, an amount of data to be sent to the communication device during the connectivity speed test;

sending, by the server, the amount of data to the communication device at a connectivity speed during the connectivity speed test;

receiving, by the server from the communication device, a second data count that includes the amount of data sent from the server to the communication device during the connectivity speed test and the first data count;

determining, at the server, the amount of data sent from the server to the communication device during the connectivity speed test based upon the first data count and the second data count; and calculating, at the server, the connectivity speed of the communication device based the amount of data sent from the server to the communication device during the connectivity speed test.

2. The method of claim 1, further comprising:

accessing, by the server, a database including information related to a plurality of communication devices; and selecting, by the server, the communication device from among the plurality of communication devices.

3. The method of claim 2, wherein the selecting comprises selecting the communication device that matches a specified criteria from among the plurality of communication devices.

4. The method of claim 1, further comprising identifying, by the server, a plurality of downstream channels being used by the communication device, wherein the receiving the first data count comprises receiving the first data count that includes an aggregate count of data received by the communication device over the plurality of downstream channels prior to the connectivity speed test being performed, wherein the determining comprises determining the amount of data to be sent to the communication device over the plurality of downstream channels during the connectivity speed test, wherein the sending comprises sending the amount of data to the communication device at the connectivity speed over the plurality of downstream channels during the connectivity speed test, wherein the receiving the second data count comprises receiving the second data count that includes an aggregate count of data sent from the server to the communication device over the plurality of downstream channels during the connectivity speed test and the first data count, and wherein the determining comprises determining the amount of data sent from the server to the communication device over the plurality of downstream channels during the connectivity speed test based upon the first data count and the second data count.

5. The method of claim 1, further comprising identifying, by the server, a plurality of downstream channels being used by the communication device, wherein the receiving the first data count comprises receiving a plurality of first data counts that include a plurality of amounts of data received by the communication device over the plurality of downstream channels prior to the connectivity speed test being performed, wherein the determining comprises determining the amount of data to be sent to the communication device over the plurality of downstream channels during the connectivity speed test, wherein the sending comprises sending the amount of data to the communication device at the connectivity speed over the plurality of downstream channels during the connectivity speed test, wherein the receiving the second data count comprises receiving a plurality of second data counts that include a plurality of amounts of data sent from the server to the communication device over the plurality of downstream channels during the connectivity speed test and the plurality of first data counts, and wherein the determining comprises determining the amount of data sent from the server to the communication device over the plurality of downstream channels during the connectivity speed test based upon the plurality of first data counts and the plurality of second data counts.

6. The method of claim 1, further comprising:

adding an access control list (ACL) to the communication device to cause the communication device to drop the amount of data sent from the server to the communication device at the connectivity speed; and removing the ACL from the communication device after the amount of data has been sent from the server to the communication device at the connectivity speed.

7. The method of claim 1, wherein the calculating comprises calculating the connectivity speed of the communication device based upon a difference between the first data count and the second data count in relation to a period of time over which the amount of data was sent from the server to the communication device at the connectivity speed during the connectivity speed test.

8. A server for performing a connectivity speed test for a communication device, the server comprising:

a memory configured to store a first data count that includes an amount of data received by the communication device prior to the connectivity speed test being performed; and a processor configured to execute instructions stored in the memory, the instructions, when executed by the processor, configuring the processor to:

determine an amount of data to be sent to the communication device during the connectivity speed test, send the amount of data to the communication device at a connectivity speed during the connectivity speed test, receive, from the communication device, a second data count that includes the amount of data sent from the server to the communication device during the connectivity speed test and the first data count, determine the amount of data sent from the server to the communication device during the connectivity speed test based upon the first data count and the second data count, and calculate the connectivity speed of the communication device based the amount of data sent from the server to the communication device during the connectivity speed test.

9. The server of claim 8, wherein the instructions, when executed by the processor, further configure the processor to:

access a database including information related to a plurality of communication devices; and select the communication device from among the plurality of communication devices.

10. The server of claim 9, wherein the instructions, when executed by the processor, configure the processor to select the communication device that matches a specified criteria from among the plurality of communication devices.

11. The server of claim 8, wherein the instructions, when executed by the processor, further configure the processor to:

identify a plurality of downstream channels being used by the communication device;

receive the first data count that includes an aggregate count of data received by the communication device over the plurality of downstream channels prior to the connectivity speed test being performed;

determine the amount of data to be sent to the communication device over the plurality of downstream channels during the connectivity speed test;

send the amount of data to the communication device at the connectivity speed over the plurality of downstream channels during the connectivity speed test;

receive the second data count that includes an aggregate count of data sent from the server to the communication device over the plurality of downstream channels during the connectivity speed test and the first data count; and determine the amount of data sent from the server to the communication device over the plurality of downstream channels during the connectivity speed test based upon the first data count and the second data count.

12. The server of claim 8, wherein the instructions, when executed by the processor, further configure the processor to:

identify a plurality of downstream channels being used by the communication device;

receive a plurality of first data counts that include a plurality of amounts of data received by the communication device over the plurality of downstream channels prior to the connectivity speed test being performed;

determine the amount of data to be sent to the communication device over the plurality of downstream channels during the connectivity speed test;

send the amount of data to the communication device at the connectivity speed over the plurality of downstream channels during the connectivity speed test;

receive a plurality of second data counts that include a plurality of amounts of data sent from the server to the communication device over the plurality of downstream channels during the connectivity speed test and the plurality of first data counts; and determine the amount of data sent from the server to the communication device over the plurality of downstream channels during the connectivity speed test based upon the plurality of first data counts and the plurality of second data counts.

13. The server of claim 8, wherein the instructions, when executed by the processor, further configure the processor to:

add an access control list (ACL) to the communication device to cause the communication device to drop the amount of data sent from the server to the communication device at the connectivity speed; and remove the ACL from the communication device after the amount of data has been sent from the server to the communication device at the connectivity speed.

14. The server of claim 8, wherein the instructions, when executed by the processor, configure the processor to calculate the connectivity speed of the communication device based upon a difference between the first data count and the second data count in relation to a period of time over which the amount of data was sent from the server to the communication device at the connectivity speed during the connectivity speed test.

15. A server for performing a connectivity speed test for a communication device, the system comprising:

a speed tester configured to:
receive, from the communication device, a first data count that includes an amount of data received by the communication device prior to the connectivity speed test being performed; and determine an amount of data to be sent to the communication device during the connectivity speed test; and a cable modem termination system configured to send the amount of data to the communication device at a connectivity speed during the connectivity speed test, wherein the speed tester is further configured to:
receive, from the communication device, a second data count that includes the amount of data sent from the server to the communication device during the connectivity speed test and the first data count, determine the amount of data sent from the server to the communication device during the connectivity speed test based upon the first data count and the second data count, and calculate the connectivity speed of the communication device based the amount of data sent from the server to the communication device during the connectivity speed test.

16. The system of claim 15, wherein the speed tester is further configured to:

access a database including information related to a plurality of communication devices; and select the communication device from among the plurality of communication devices.

17. The system of claim 15, wherein the speed tester is further configured to:

identify a plurality of downstream channels being used by the communication device;

receive the first data count that includes an aggregate count of data received by the communication device over the plurality of downstream channels prior to the connectivity speed test being performed;

determine the amount of data to be sent to the communication device over the plurality of downstream channels during the connectivity speed test;

receive the second data count that includes an aggregate count of data sent from the server to the communication device over the plurality of downstream channels during the connectivity speed test and the first data count; and determine the amount of data sent from the server to the communication device over the plurality of downstream channels during the connectivity speed test based upon the first data count and the second data count, and wherein the cable modem termination system is configured to send the amount of data to the communication device at the connectivity speed over the plurality of downstream channels during the connectivity speed test.

18. The system of claim 15, wherein the speed tester is further configured to:

identify a plurality of downstream channels being used by the communication device;

receive a plurality of first data counts that include a plurality of amounts of data received by the communication device over the plurality of downstream channels prior to the connectivity speed test being performed;

determine the amount of data to be sent to the communication device over the plurality of downstream channels during the connectivity speed test;

receive a plurality of second data counts that include a plurality of amounts of data sent from the server to the communication device over the plurality of downstream channels during the connectivity speed test and the plurality of first data counts; and determine the amount of data sent from the server to the communication device over the plurality of downstream channels during the connectivity speed test based upon the plurality of first data counts and the plurality of second data counts, and wherein the cable modem termination system is configured to send the amount of data to the communication device at the connectivity speed over the plurality of downstream channels during the connectivity speed test.

19. The system of claim 15, wherein the speed tester is further configured to:

add an access control list (ACL) to the communication device to cause the communication device to drop the amount of data sent from the server to the communication device at the connectivity speed; and remove the ACL from the communication device after the amount of data has been sent from the server to the communication device at the connectivity speed.

20. The system of claim 15, wherein the speed tester is configured to calculate the connectivity speed of the communication device based upon a difference between the first data count and the second data count in relation to a period of time over which the amount of data was sent from the server to the communication device at the connectivity speed during the connectivity speed test.

* * * * *